Patented June 23, 1925.

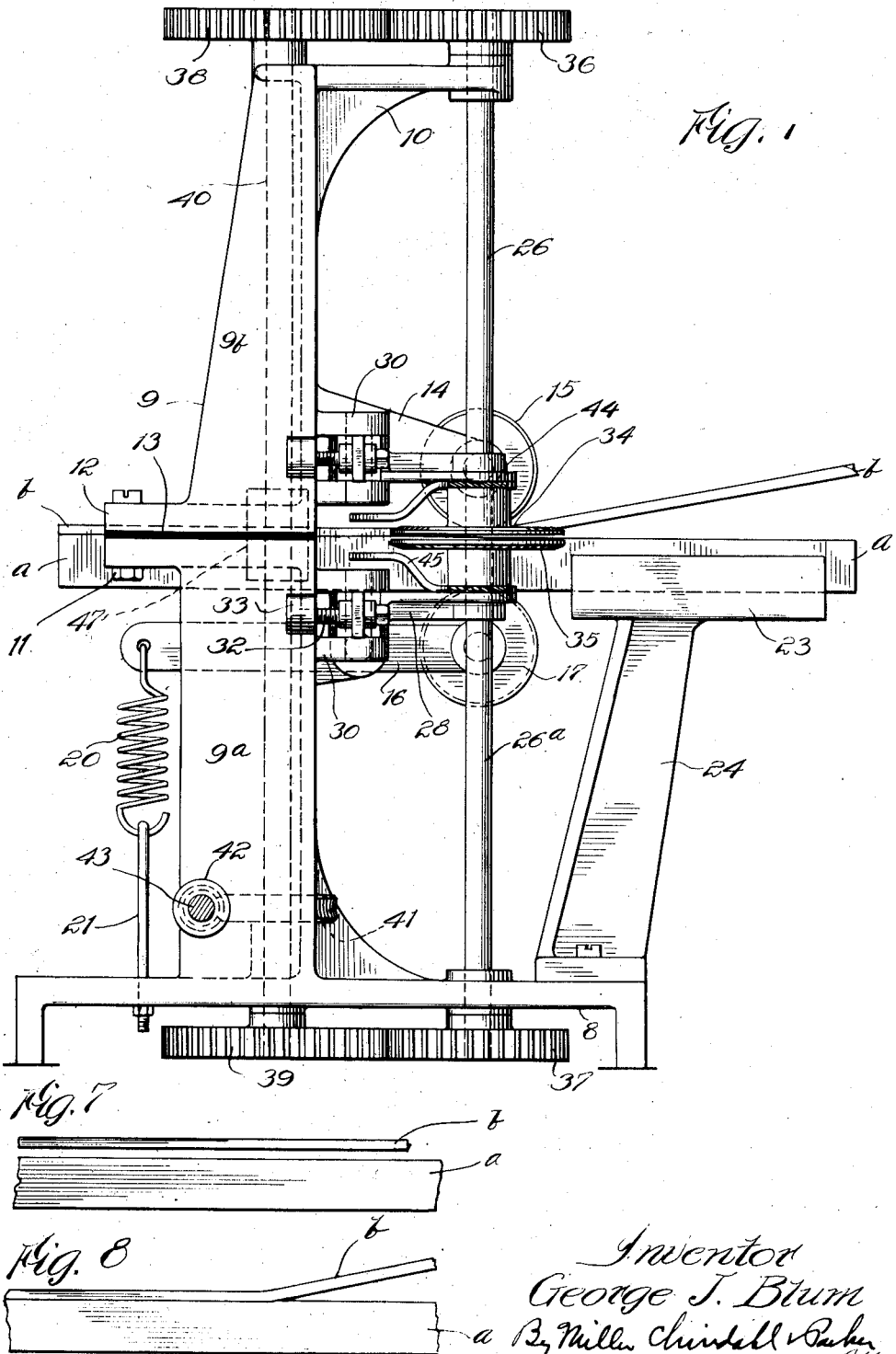

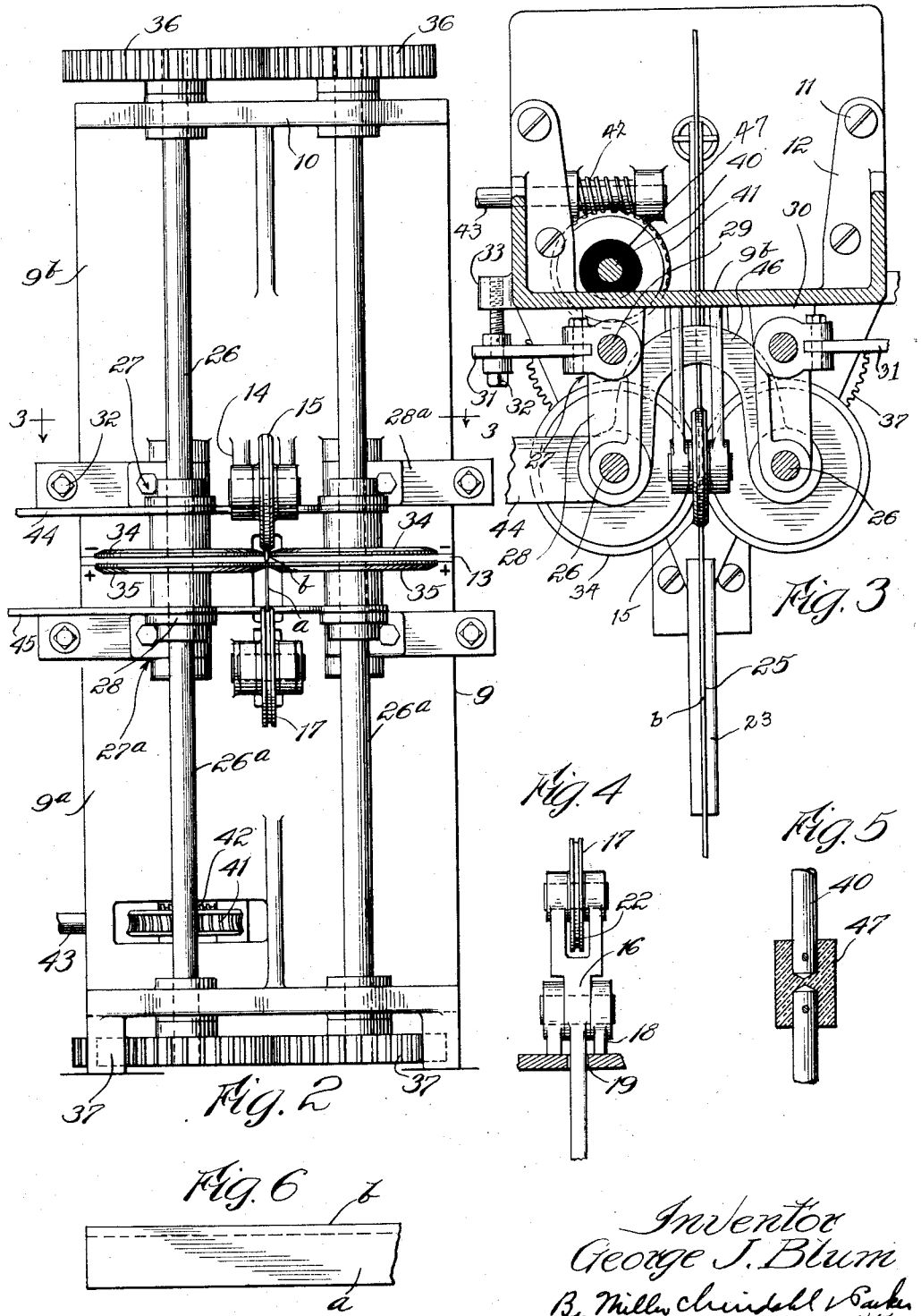

1,542,984

UNITED STATES PATENT OFFICE.

GEORGE J. BLUM, OF CHICAGO, ILLINOIS, ASSIGNOR TO ARMSTRONG-BLUM MANUFACTURING COMPANY, OF CHICAGO, ILLINOIS, A CORPORATION OF ILLINOIS.

WELDING MACHINE.

Application filed December 30, 1921. Serial No. 525,926.

*To all whom it may concern:*

Be it known that I, GEORGE J. BLUM, a citizen of the United States, residing at Chicago, in the county of Cook and State of Illinois, have invented certain new and useful Improvements in Welding Machines, of which the following is a specification.

The invention refers to machines for welding two metallic parts together, and has for its general aim the provision of a machine of this character by means of which the parts may, irrespective of their length, be effectively and permanently united in edge to edge relation to form an integral structure.

My invention distinguishes from the welding operation commonly known as butt-welding in that the parts are united in an operation which progresses at a uniform rate of speed from one end of the part to be formed to the other. Thus it consists primarily in passing the two members between a pair of opposed bearing surfaces, in abutting relation and at a uniform rate of speed, so as to force the members together progressively, and while their abutting edges are thus brought into integral contact, heating the same to the fusion point.

The butt-welding operation above referred to is incapable of use where sheets or strips of any substantial length are to be welded together. This is due to the fact that it is impossible to effect the necessary intimate contact between the edges to be joined simultaneously throughout their entire lengths. Also, the electric current or other heating medium cannot effectually be uniformly distributed. The difficulties thus involved in the use of the former method of welding are wholly overcome by my invention by reason of the progressive character of the operation.

A general object of the invention is to provide a machine of a practical character, efficient in operation for carrying out my improved welding process.

In the accompanying drawings I have shown one embodiment only of the invention, but it is contemplated that various changes in the form, construction and arrangement of the parts may be made by those skilled in the art without departing from the spirit and scope of the invention as expressed in the appended claims.

Figure 1 of the drawings is a side elevation of my improved machine showing two strips of metal passing therethrough to be united. Fig. 2 is a front elevational view of the machine. Fig. 3 is a horizontal sectional view taken substantially in the plane of line 3—3 of Fig. 2. Fig. 4 is a fragmentary detail view of the manner of mounting one of the rolls constituting one of the opposed bearing surfaces between which the parts to be united are passed. Fig. 5 is a detail view showing the manner of insulating two sections of one of the drive shafts of the machine. Fig. 6 is a side view of a cutting blade formed from two separate strips secured together. Fig. 7 is a side elevation showing the two strips in detached relation which are to be secured together to form a cutting blade. Fig. 8 is a similar view but showing the parts partially united.

The machine comprises a frame having a base 8 and an upright portion or standard 9 with an overarm 10 at its upper end. The standard is preferably formed in two sections including a lower section $9^a$ and a top section $9^b$, the two sections being secured together as by means of bolts 11 entered through flanges 12 and separated by a sheet of insulation 13 of suitable material. Projecting forwardly from the top section $9^b$ is a bifurcated arm 14 upon which is journaled on a horizontal axis a roller 15. Projecting forwardly from the lower section of the standard is an arm 16 having a bifurcated forward end in which is journaled a roller 17. Said arm 16 is pivotally mounted between its ends in a pair of spaced lugs 18 carried by the standard, and the arm projects rearwardly through an opening 19 in the frame for connection at its rear end with a coiled contractile spring 20, the lower end of which is anchored to the base as by means of an eye-bolt 21. These rollers 15 and 17 constitute bearing elements providing opposed bearing surfaces between which the parts to be joined are passed in abutting relation.

It will be observed that by adjusting the nut of the eye-bolt 21 the tension of the spring 20 may be varied at will so as to vary the pressure exerted upon the parts by the rollers. Preferably the roller 17 is provided with a groove 22 in its periphery so as to assist in maintaining the relative positions of the strips. To further cause these strips to be maintained in proper position, I provide forwardly of the machine a guide member 23 carried upon a bracket or arm 24 mounted upon the base of the frame. This guide member 23 is provided with a longitudinal groove 25 in its upper edge to receive the lower edge of one of the parts to be united.

The parts are further maintained in position by the means for imparting movement to the strips in their passage between the rolls 15 and 17 as well as for conducting electric current through the adjoining edges of the strips to raise the same to the fusion temperature. This means will now be described.

Forwardly of the frame are mounted two pairs of upright alined shafts 26 and 26$^a$. The upper shaft 26 of each pair is journaled at its upper end in the overarm 10 and at its lower end in a bracket 27 mounted upon the upper section of the standard. Likewise the lower section 26$^a$ is journaled at its lower end in the frame and at its upper end in a bracket 27$^a$ carried by the lower section of the standard. Each of these brackets comprises a forwardly projecting arm 28 pivoted at 29 between a pair of forwardly projecting lugs 30 rigid with the standard. Projecting laterally and outwardly from the inner end of the arm 28 is an arm 31, the free end of which is connected with the standard by means of an adjusting screw 32 having a screw-threaded connection with the standard through the medium of a lug 33 (Fig. 3). Said arm 31 is made slightly resilient so as to hold the disk yieldingly to the work.

The adjacent ends of the shafts 26 and 26$^a$ are spaced a short distance apart and have fixed thereto respectively disks 34 and 35; and the upper and lower ends of the respective shafts have rigid therewith spur gear wheels 36 and 37. The gears of the two pairs of shafts are arranged to mesh with each other as shown in Fig. 2; and the gears 36 and 37 of one pair of shafts are arranged to mesh with gears 38 and 39 secured at the upper and lower ends respectively of a drive shaft 40 journaled in the standard. This shaft has secured near its lower end a worm wheel 41 meshing with a worm 42 on a shaft 43 connected with a suitable source of power. It will thus be apparent that all of the shafts 26 and 26$^a$ are driven simultaneously at the same rate of speed.

Electric current is supplied to the pairs of disks 34 and 35 by any suitable means which in the present instance comprises a pair of bus-bars 44 and 45 which are of opposite polarity and are connected respectively to the shafts 26 and 26$^a$ of each pair. Thus each of the bars is apertured to receive the corresponding shafts 26 or 26$^a$, and the portion of each bar extending between the shafts is preferably made U-shaped as at 46 to accommodate the upright rolls 15 and 17. By the arrangement set forth, it will be apparent that current supplied to the bus-bars will, upon the passage of the two strips between the disks 34 and 35, flow from the disks of one pair to the disks of the other through the adjoining portions of the abutting edges of the strips, so as to effectually raise their temperatures to the fusion point. By means of the adjusting screws 32, the brackets 27 and 27$^a$ carrying the adjacent ends of the shafts 26 and 26$^a$ of each pair are capable of adjustment to vary the degree of pressure exerted by the resilient arms 31, through the disks 34 and 35, upon the strips passing between the disks.

The shaft 40 while extending throughout the length of the standard is constructed so as not to connect electrically the two sections 9$^a$ and 9$^b$ of the standard. This is accomplished by making this shaft in two sections connected together by means of a block or cylinder 47 of fibre or other suitable insulating material (Fig. 5).

In the operation of uniting two strips $a$ and $b$ (Fig. 6) for example, which are to constitute together a cutting blade, the two strips are passed edge to edge between the opposed upright rolls 15 and 17 on the one hand and the two pairs of horizontal disks 34 and 35 on the other hand. The coiled contractile spring 20 acting through the arm 16 causes the roll 17 to exert a predetermined degree of pressure upon the strip $a$, and the disks 34 and 35 are arranged so as to contact respectively the sides of the strip $a$ and of the strip $b$ at their adjoining edge portions. Electric current of the proper amperage is supplied by the bus-bars 44 and 45, and the disks are rotated to effect the passage of the strips at a uniform rate of speed between the disks, the rate of speed being determined by the time required to raise the temperature of the metals to be joined to the fusion point. The pressure exerted by the roll 17, is such as to force the two strips firmly together, and the metals being reduced to a semi-plastic state become intimately united. As shown in Fig. 6, the effect is to force the strip $b$ bodily into the adjoining edge of the strip $a$ (Fig. 6) while at the same time reducing somewhat the width of the strip $b$. As shown in said figure, this strip $b$ being relatively narrow, when thus heated becomes flexible edgewise and hence as the edges give way is caused to bend upwardly substantially at its point of contact with the roll 15. In the continued passage of the strips between the rolls, they are gradually forced into intimate contact progressively from one end of the blade to the other.

It will be apparent that I have produced a machine for effectually carrying out a novel welding operation in which two parts may be intimately united in edge to edge relation irrespective of the length thereof. The operation is continuous, and progresses gradually along the joint to be formed so that intimate contact of the parts at the point of joinder is assured. Moreover, the area over which the operation takes place at any given time is relatively small, wherefore the difficulty heretofore experienced in attempts to unite by butt welding parts of any substantial length, is overcome.

The means for applying heat to the adjoining edges of the parts, serves, it will be noted, also as a means for maintaining the parts in proper relation as well as for imparting motion to the parts.

As a result of my improved method of welding two parts together, it is possible to produce articles of manufacture, such as hacksaw blades and similar metal cutting tools of a character much superior to those as heretofore constructed from solid strips of metal. Thus the back or body of the blade may be made of relatively cheap steel having a low carbon content and hence of a tough and durable quality; while the cutting edge portion may be made of a higher grade material, such as tungsten steel, but without materially adding to the cost of the blade as compared with the cost of the ordinary blade made from a solid strip of steel of high carbon content. At the same time, the blade is much superior to the ordinary blade, being capable of outwearing the same by approximately eight times.

I desire to point out that while the machine herein shown is adapted for use in making hacksaw blades, the invention is obviously not limited to this particular use but is susceptible of many and varied applications which will occur to those skilled in the art.

I claim as my invention:

1. An electric welding machine having two pairs of parallel shafts each carrying an electrically energized disk, the axes of the corresponding disks of each pair being in alinement and the disks of each pair being spaced a short distance apart, means for guiding two members to be joined between said disks in edge to edge relation with the joint between the members disposed in a plane lying in the space between the pairs of disks, and means for exerting pressure upon said members to force their abutting edges into intimate contact as they pass between said disks, the disks of the respective pairs being of opposite polarity so as to effect the passage of current from opposite sides of one of said members through their abutting edges and then out from the opposite sides of the other member.

2. An electric welding machine having two pairs of parallel shafts each carrying an electrically energized disk the axes of the corresponding disks of each pair being in alinement and the disks of each pair being spaced a short distance apart, means for guiding two members to be joined between said disks in edge to edge relation with the joint between the members disposed in a plane lying in the space between the pairs of disks, means for exerting pressure upon said members to force their abutting edges into intimate contact as they pass between said disks, the disks of the respective pairs being of opposite polarity so as to effect the passage of current from opposite sides of one of said members through their abutting edges and then out from the opposite sides of the other member, and means for rotating all of said disks so as to impart movement to said members.

3. An electric welder comprising a standard having an upper section and a lower section insulated from each other, each of said sections having a pair of parallel upright shafts each carrying an electrically energized contact disk, said disks being arranged to receive between them two members to be joined in edge to edge relation, means for simultaneously actuating said disks to effect movement of the members through the machine, and means for exerting pressure upon said members to force them into intimate contact as they pass between the disks, the means for actuating said disks including a drive shaft journaled in each of said sections of the standard but constructed in two sections insulated from each other.

4. A welding machine comprising, in combination, a frame having a base, a standard rising from the base, and an overarm on the standard, two pairs of alined shafts journaled at their upper and lower ends in the overarm and base respectively and spaced apart at their adjacent ends, contact disks carried by the adjacent ends of said shafts arranged to receive between them the parts to be joined, and means for exerting pressure upon said parts including a stationarily mounted roll element carried by one section of the standard and a moving roll element carried by the other section of the standard.

5. A welding machine comprising, in combination, a frame, two pairs of alined shafts journaled in the frame and spaced apart at their adjacent ends, contact disks carried by the adjacent ends of said shafts arranged to receive between them the parts to be joined, and means for exerting pressure upon said parts including a stationarily mounted roll element and a moving roll element, the last mentioned roll element having a supporting arm pivoted in the frame, and spring means for exerting a variable pressure by said roll element upon said parts.

6. A welding machine comprising, in combination, a frame, a plurality of disks carried by the frame and arranged to receive between them two parts to be joined in edge to edge relation, and means for exerting pressure upon said parts to force them into intimate contact while passing between said disks, said means including a moving roll element, a lever arm pivoted in the frame and carrying said roll element, and spring means for moving said arm to move the roll element so as to force said parts together.

7. An electric welding machine comprising two separate units insulated from each other, each of said units comprising a bearing surface for one of two parts to be united in edge to edge relation and a pair of disks between which one of said parts is arranged to pass, the disks of the two units being of opposite polarity.

8. A welding machine comprising, in combination, a frame, means providing opposed bearing surfaces between which two parts to be united may pass in abutting relation, and means for imparting motion to said parts including a disk, a shaft journaled at one end in the frame and carrying said disk at its free end, and a lever pivoted in the frame and having one arm connected with said shaft near its free end, and means acting upon the other arm of said lever to move said shaft whereby to vary the degree of pressure exerted by said disk upon the part to be moved thereby.

9. A welding machine comprising, in combination, means providing a pair of opposed bearing surfaces adapted to receive between them two parts in edge to edge relation, and means for imparting motion to said parts including a plurality of disks, shafts carrying said disks, and means providing journal bearings for said shafts adjacent the disks but capable of adjustment to vary the degree of pressure exerted by the disks upon said parts.

10. In a machine of the class described, the combination of two pairs of opposed roll elements spaced apart so as to receive between them two parts to be joined in abutting edge relation, means for guiding one of said strips between one pair of said elements, and means for rotating one pair of said elements.

11. A welding machine having means for guiding two opposed strips in abutting edge relation, means adapted to effect the passage of electric currents across the abutting edges of the strips comprising a pair of equi-potential electrodes applied to each strip on opposite sides thereof and of a polarity opposite that of the electrodes applied to the other strip, whereby to reduce the metal at the point of contact between them to a state of semi-plasticity, and means for exerting pressure upon the strips so as to force them bodily together to effect a physical commingling of the metals and thereby intimately to unite the strips into an integral structure.

12. A welding machine having a pair of disks arranged to receive between their peripheral edges one of two parts to be united, a second pair of disks arranged adjacent the disks of the first pair and adapted to receive between them the other one of said parts with the two parts in abutting edge relation, means for causing the flow of electric energy from the disks of one pair through said parts across their abutting edges to the disks of the other pair, and means for driving said disks to impart a uniform feeding movement to the parts.

13. A welding machine having means for guiding in abutting relation a pair of members to be joined, means for progressively applying heat to such abutting edges to reduce them to a state of semi-plasticity, and spring actuated means coacting with said guiding means to effect a continuous pressure upon the parts when the edges of the latter give way in their semi-plastic condition.

14. A welding machine having means for applying heat to two strips to be joined at their abutting edges so as to reduce the metal of the strips to a state of semi-plasticity, and means for exerting a continuous pressure upon the strips to force them bodily together whereby to effect a physical commingling of the metals and thereby intimately to unite the parts into an integral structure, said means being adapted to accommodate itself automatically to variations in the combined width of the two strips.

15. A machine for welding a narrow strip of metal upon a relatively rigid base, in combination, a pair of bearing elements arranged to provide opposed bearing surfaces, means for guiding the parts to be welded between said bearing surfaces in edge to edge relation, yieldable means for exerting pressure upon one of said bearing elements, and means for heating the strip and the edge portion of the base to a state of semi-plasticity so as to effect under pressure the physical commingling of the metals of the two parts in their passage between said bearing elements.

16. A welding machine having means for guiding two opposed strips in abutting edge relation, and two pairs of electrodes adapted to engage opposite sides of the strips, there being one pair of electrodes for each strip and the electrodes of each pair being of equal potential and of a polarity opposite that of the electrodes engaging the other strip.

In testimony whereof, I have hereunto set my hand.

GEORGE J. BLUM.